United States Patent
Loescher

(10) Patent No.: US 6,823,598 B1
(45) Date of Patent: Nov. 30, 2004

(54) LASER SUPPORTING ATTACHMENT FOR VEHICLE ALIGNMENT SYSTEM

(76) Inventor: Michael C. Loescher, 3552 Omni Cir., Edgewater, FL (US) 32141

( * ) Notice: Subject to any disclaimer, the term of this patent is extended or adjusted under 35 U.S.C. 154(b) by 0 days.

(21) Appl. No.: 10/676,994

(22) Filed: Sep. 30, 2003

(51) Int. Cl.$^7$ ............................................. G01B 11/26
(52) U.S. Cl. ................... 33/286; 33/203.18; 33/DIG. 21
(58) Field of Search ............................... 33/203, 203.18, 33/286, 288, 568, 573, DIG. 21

(56) References Cited

U.S. PATENT DOCUMENTS

| | | | |
|---|---|---|---|
| 4,278,350 A | | 7/1981 | Rawle et al. |
| 4,416,065 A | | 11/1983 | Hunter |
| 4,455,759 A | * | 6/1984 | Coetsier ....................... 33/288 |
| 4,466,196 A | | 8/1984 | Woodruff |
| 4,573,275 A | | 3/1986 | Bremer |
| 4,854,702 A | | 8/1989 | Stieff |
| 4,863,267 A | * | 9/1989 | Bendickson et al. .......... 33/288 |
| 4,898,464 A | | 2/1990 | Thorne et al. |
| 4,918,821 A | * | 4/1990 | Bjork ....................... 33/203.18 |
| 5,048,954 A | | 9/1991 | Madey et al. |
| 5,274,433 A | | 12/1993 | Madey et al. |
| 5,425,523 A | | 6/1995 | Madey et al. |
| 5,589,927 A | * | 12/1996 | Corghi ...................... 33/203.18 |
| 5,592,383 A | * | 1/1997 | Rogers et al. ................. 33/286 |
| 5,724,743 A | * | 3/1998 | Jackson ........................ 33/288 |
| 5,748,301 A | * | 5/1998 | Muller et al. .................. 33/286 |
| 6,082,011 A | | 7/2000 | Phillips, III |
| 6,622,389 B1 | * | 9/2003 | Pellegrino ................ 33/203.18 |
| 6,684,516 B2 | * | 2/2004 | Voeller et al. ............ 33/203.18 |
| 6,684,517 B2 | * | 2/2004 | Corghi ..................... 33/203.18 |

* cited by examiner

*Primary Examiner*—G. Bradley Bennett
(74) *Attorney, Agent, or Firm*—William M. Hobby, III

(57) ABSTRACT

A vehicle laser alignment system laser supporting attachment for mounting a laser module to either the wheel spindle or hub of a vehicle has a plurality of attachments for attaching to different vehicles. A laser module supporting mandrel has a cradle for supporting a laser module on one end and a mandrel to wheel adapter connection on the other end thereof and has a slot formed in the side of the mandrel. A mandrel-to-wheel adapter is selected for a particular vehicle and is removably attached to the mandrel on the mandrel-to-wheel adapter connection for attaching the mandrel to a specific vehicle. An adapter holding plate has a threaded opening therein and is sized to fit into the mandrel slot for bolting the mandrel to a specific mandrel-to-wheel adapter.

7 Claims, 3 Drawing Sheets

LASER SUPPORTING ATTACHMENT FOR VEHICLE ALIGNMENT SYSTEM

BACKGROUND OF THE INVENTION

The present invention relates generally to wheel alignment systems and more particularly to a laser-based wheel alignment system having a laser supporting attachment for a vehicle wheel spindle or hub.

The axes about which the front wheels of an automobile or truck turn as it travels down the road must be carefully set to minimize tire wear and insure safe and stable handling characteristics. The orientation of these axes is determined by three angles: 1) the toe-in angle, which specifies the angle between the rim of the wheels and a line drawn parallel to the direction in which the car is pointed; 2) the camber angle, which specifies the angle between the rim of the wheels and the vertical; and 3) the caster angle, which specifies the angle between the vertical and the axis about which the individual wheels turn when changing direction. These angles are typically specified individually for each wheel and for each model and make of vehicle and must be periodically tested and reset as the vehicle and tires age to insure continued economic and safe vehicle performance.

The alignment of the steerable wheels of motor vehicles with respect to camber, toe-in and caster measuring devices of axle measurement equipment must assume a position accurately defined with respect to a vehicle part. Prior art installations include fastening plates for the mounting of the measuring devices. The alignment of the plane of the fastening plate takes place parallel to the plane of the outer surface of the respective brake drum of the wheel at a distance by means of abutment pins connected with the fastening plate. In order that the end faces of the abutment pins are able to abut at the flat-machined reference wheel surface hub without having to disassemble the vehicle wheel, the wheel disk is provided with correspondingly constructed bores, through which extend the abutment pins. Arms with hook-shaped ends are used in the fastening of the installation to the wheel and extend about apertures of the wheel disk and are connected with the fastening plate. In this manner, the measurement equipment mounted on the fastening plate is retained supported on the brake drum or the wheel hub. It is thereby disadvantageous and costly in that it is not possible in practice to control the abutment of the end faces of the contact pins on the reference surface with simple mechanical means since the abutment surface is not freely accessible. If the abutment of all abutment pins on the reference surface is not assured, then incorrect adjustments of camber, toe-in or caster may result therefrom when unevenness of the reference surface are not noticed or dirt particles or metal chips are disposed between abutment pins and abutment surface or if the installation rests tilted or canted in the bore holes.

The present invention attaches a laser module directly to the vehicle wheel spindle or hub to provide a more accurate positioning of the laser.

SUMMARY OF THE INVENTION

A vehicle laser alignment system laser supporting attachment for mounting a laser module to either the wheel spindle or hub of a vehicle has a plurality of attachments for attaching to different vehicles. A laser module supporting mandrel has a cradle for supporting the laser module on one end and a mandrel to wheel adapter connection on the other end thereof and has a slot formed in the side of the mandrel. A mandrel-to-wheel adapter is selected for a particular vehicle and is removably attached to the mandrel on the mandrel-to-wheel adapter connection for attaching the mandrel to a specific vehicle. An adapter holding plate has a threaded opening therein and is sized to fit into the mandrel slot for bolting the mandrel to a specific mandrel-to-wheel adapter on one end of the mandrel. The threaded bolt removably fastens the mandrel-to-wheel adapter to the mandrel by bolting through the mandrel-to-wheel adapter into the adapter holding plate. The mandrel-to-wheel adapter can be rapidly changed for threadedly attaching the mandrel to the end of a threaded spindle or for bolting the mandrel onto the wheel hub.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
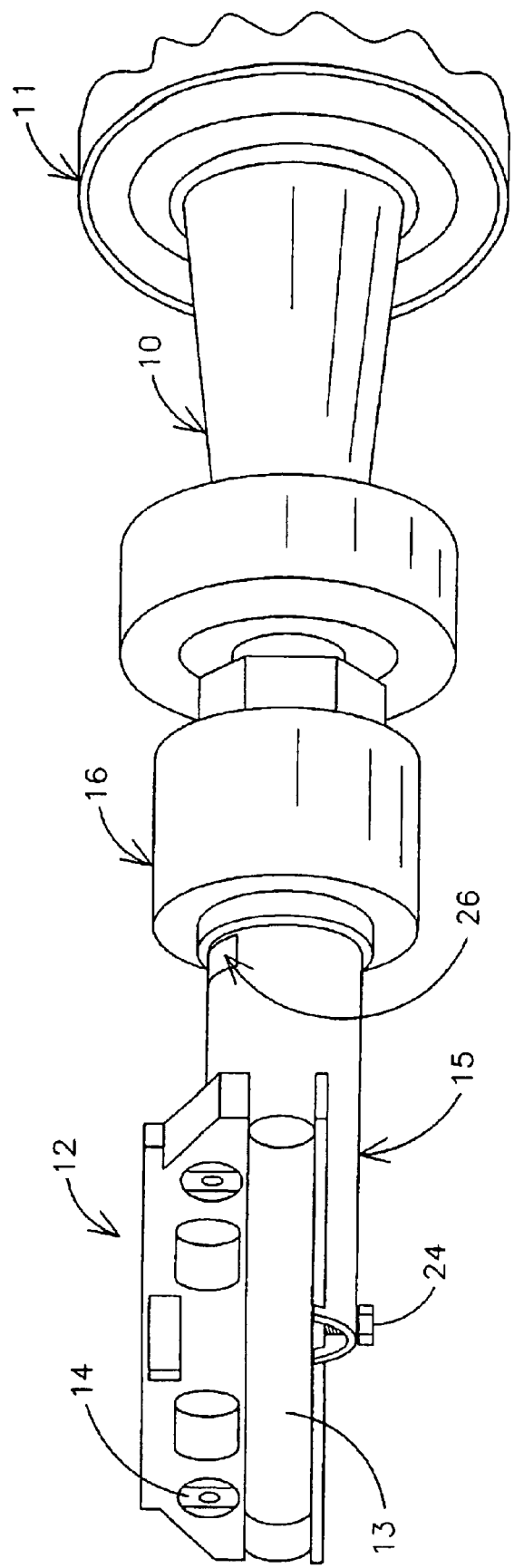
FIG. 1 is a perspective view of a laser supporting attachment according to the present invention attached to a wheel spindle.
Figure 2:
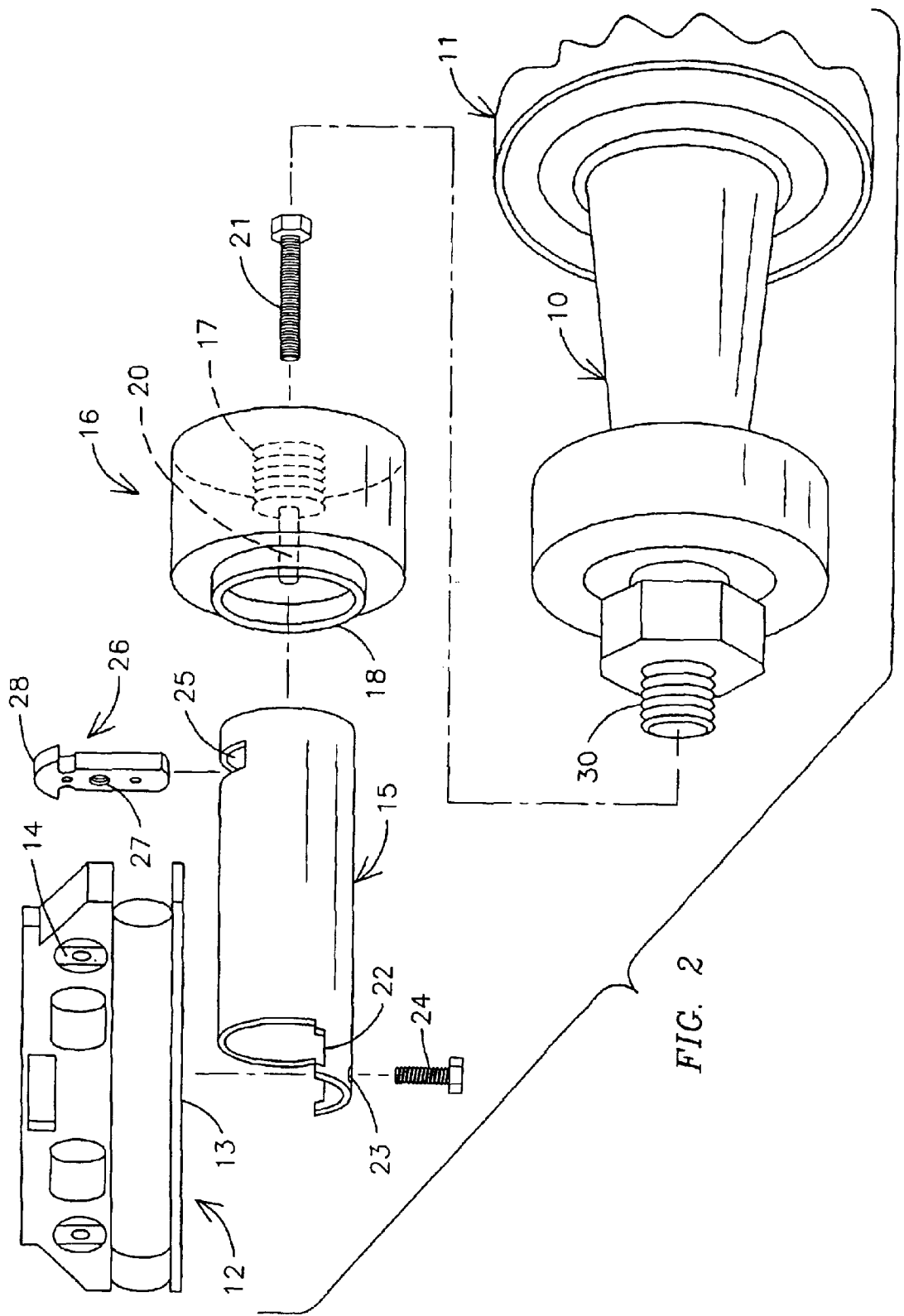
FIG. 2 is an exploded perspective view of a laser supporting attachment of FIG. 1.
Figure 4:
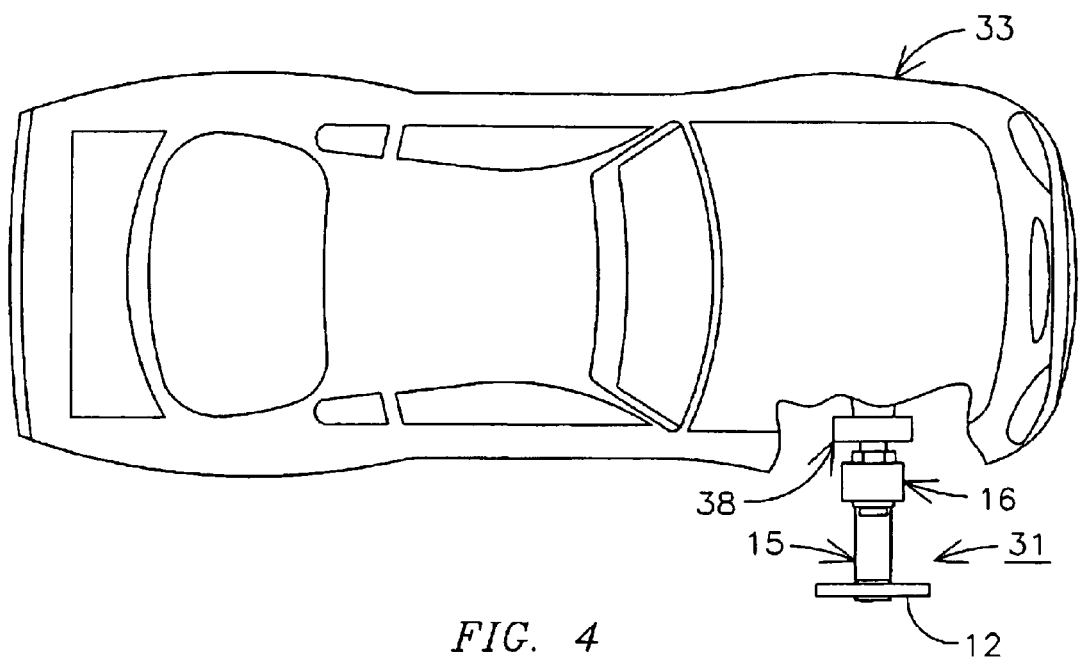
FIG. 4 is a cutaway elevation of the laser supporting attachment attached to a vehicle wheel.

Referring to the drawings and especially to FIGS. 1 and 2, a laser supporting attachment for a vehicle alignment system is illustrated attached to the end of a spindle 10 of a vehicle wheel 11. A laser module 12 has a laser 13 and bubble levels 14 and is attached to a laser supporting mandrel 15. The mandrel 15 has a spindle attaching adapter 16 attached to one end thereof for attaching the mandrel 15 to the wheel spindle 10. In the case of FIGS. 1, 2 and 4, the adapter 16 is a cylindrical adapter having a threaded bore 17 in one end with threads sized to fit on the threaded end of the spindle 10. The adapter 16 has a supporting annular lip 18 and has a bore 20 passing therethrough for receiving a nut 21. The mandrel 15 can be seen having a laser module cradle 22 formed on one end thereof and having a bore 23 through the bottom thereof for receiving a nut 24. The laser module 12 is supported in the cradle 22, as seen in FIG. 1, and the bolt 24 is passed through the opening 23 and threaded into the bottom of the laser module 12 for supporting the laser module on the end of the mandrel 15. The mandrel 15 also has a slot 25 in the other end portion thereof sized to receive an adapter holding plate 26, shaped similar to a T-bar, and having a threaded opening 27 in the center thereof. The top of the plate 26 has the general curve as the cylindrical mandrel 15. The adapter holding plate 26 is slipped into to the slot 25 so that the adapter 16 can be positioned on the end of the mandrel 15 supported by the lip 18 sliding into the end of the cylindrical mandrel 15. The bolt 21 is passing through the bore 20 and bolted into the threaded opening 27 in the adapter holding plate 26. This allow the mandrel 15 with the adapter 16 to be attached to the end of the spindle 10 onto the threaded portion 30 after removing the grease cap that normally covers the end of the spindle. Once the laser module 12 supporting mandrel 15 with the adapter 16 attached thereto is attached to the threads 30, the laser is then used in a laser alignment system by directing the laser at positioned targets for adjusting the toe-in angle and the camber and caster angles of the wheel.

The present invention, however, is a universal laser module mounting system in which a variety of adapters 16 can be attached to a mandrel 15 for different vehicles having different wheel configurations.

Figure 3:
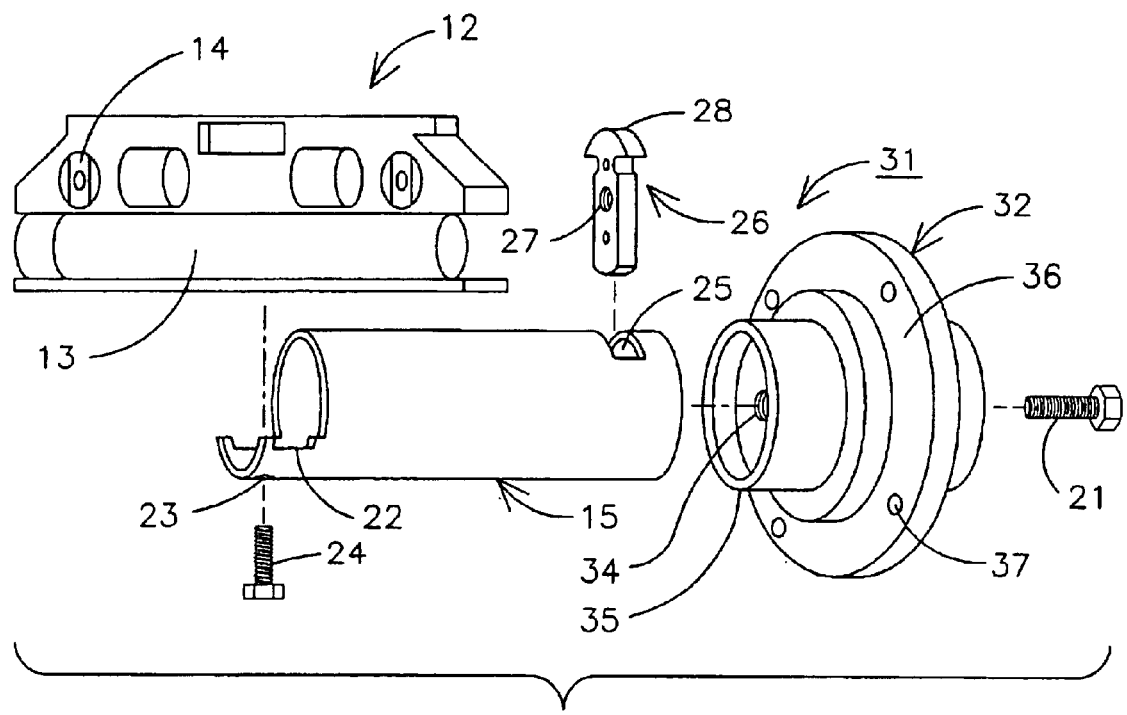
FIG. 3 is an exploded perspective view of a laser supporting attachment having a hub attaching adapter.

Turning to FIGS. 3 and 4, an alternate embodiment 31 of a laser supporting attachment for a vehicle alignment system is illustrated in which the mandrel 15 has the laser module 12 fitting into the cradle 22 and anchored with the bolt 24 in the same manner as shown in FIGS. 1 and 2. The mandrel 15 has slot 25 and an identical adapter holding plate 26 for sliding thereinto. However, a different adapter 32 is attached to the mandrel 15 for mounting the mandrel 15 to a wheel hub of a vehicle 33. The hub mounting adapter 32 has a bore 34 therethrough for receiving the nut 21 and also has a supporting lip 35 around one end. Adapter 32, however, has a hub mounting flange 36 having a plurality of openings 37 positioned to fit over the studs of a particular wheel hub for mounting the laser supporting attachment 31 to the vehicle 33 wheel 38 for supporting the laser module 12 for use in aligning a vehicle wheels 38. The adapter plate 32 is attached to the mandrel 15 with the bolt 21 passing through the bore 34 and is attached to the threads 27 of the adapter holding plate 26.

The present laser supporting attachment for vehicle alignment systems advantageously allows the same laser module and attaching mandrel to be used for any desired vehicle used with a small number of wheel adapters. The present invention advantageously attaches the laser module directly to the spindle or at the end of the hub to avoid the runout of other systems which attach laser modules to the wheel rim or to the tires and thereby provides a more accurate alignment system. However, the present invention is not to be construed as limited to the forms shown which are to be considered illustrative rather than restrictive.

I claim:

1. A laser supporting attachment for a laser alignment system comprising:
   a laser module;
   a mandrel having a laser module attaching support on one end thereof for attaching said laser module thereto and a mandrel to wheel adapter connection on the other end thereof, said mandrel having a slot formed in the side thereof and being hollow therein;
   a mandrel to wheel adapter removably attachable to said mandrel on the mandrel to wheel adapter connection for attaching said mandrel to a specific vehicle; and
   an adapter holding plate having a threaded opening therein and being sized to fit in said mandrel slot for bolting said mandrel to wheel adapter to said mandrel from one end thereof; and
   a threaded bolt removably fastening said mandrel to wheel adapter to said mandrel and adapter holding plate whereby a laser module can be readily attached to a vehicle wheel spindle or hub.

2. A laser supporting attachment for a laser alignment system in accordance with claim 1 in which said adapter holding plate has a curved top to match the curve in said mandrel.

3. A laser supporting attachment for a laser alignment system in accordance with claim 2 in which said mandrel laser module attaching support includes a cradle for cradling said laser module therein.

4. A laser supporting attachment for a laser alignment system in accordance with claim 3 in which said mandrel has an opening therein located adjacent said laser module cradle for holding a bolt for bolting said laser module to said mandrel.

5. A laser supporting attachment for a laser alignment system in accordance with claim 4 in which said mandrel to wheel adapter is threaded for attaching to a spindle threads.

6. A laser supporting attachment for a laser alignment system in accordance with claim 4 in which said mandrel to wheel adapter has a flange with a plurality of holes therein aligned for attaching to a wheel hub.

7. A method of supporting a laser for a laser alignment system comprising the steps of:
   selecting a laser module;
   selecting a mandrel having a laser module attaching support on one end thereof for attaching said laser module thereto and a mandrel to wheel adapter connection on the other end thereof, said mandrel having a slot formed in the side thereof and being hollow therein;
   selecting a mandrel to wheel adapter removably attachable to said mandrel on the mandrel to wheel adapter connection for attaching said mandrel to a specific vehicle;
   selecting an adapter holding plate having a threaded opening therein and being sized to fit in said mandrel slot for bolting said mandrel to wheel adapter to said mandrel from one end thereof;
   sliding said adapter holding plate into the slot in the side of said mandrel;
   bolting said selected mandrel to wheel adapter to said mandrel and adapter holding plate; and
   attaching said mandrel and laser module to the wheel of a vehicle.

* * * * *